(12) United States Patent
LaRue

(10) Patent No.: US 6,477,545 B1
(45) Date of Patent: Nov. 5, 2002

(54) SYSTEM AND METHODS FOR ROBUST SYNCHRONIZATION OF DATASETS

(75) Inventor: Chris LaRue, Santa Cruz, CA (US)

(73) Assignee: Starfish Software, Inc., Scotts Valley, CA (US)

( * ) Notice: Subject to any disclaimer, the term of this patent is extended or adjusted under 35 U.S.C. 154(b) by 0 days.

(21) Appl. No.: 09/208,815

(22) Filed: Dec. 8, 1998

Related U.S. Application Data

(60) Provisional application No. 60/109,983, filed on Nov. 25, 1998, and provisional application No. 60/106,189, filed on Oct. 28, 1998.

(51) Int. Cl.⁷ .............................................. G06F 12/00
(52) U.S. Cl. ........................................ 707/201; 707/8
(58) Field of Search .................... 707/8, 9, 10, 101, 707/102, 104, 200, 201, 202, 203, 204

(56) References Cited

U.S. PATENT DOCUMENTS

| | | | |
|---|---|---|---|
| 4,769,796 A | 9/1988 | Levine | 368/29 |
| 4,866,611 A | 9/1989 | Cree et al. | 364/300 |
| 4,881,179 A | 11/1989 | Vincent | 364/518 |
| 4,977,520 A | 12/1990 | McGaughey, III et al. | 364/521 |
| 5,113,380 A | 5/1992 | Levine | 368/10 |
| 5,224,212 A | 6/1993 | Rosenthal et al. | 395/250 |
| 5,392,390 A | 2/1995 | Crozier | 395/161 |
| 5,442,783 A | 8/1995 | Oswald et al. | 395/600 |
| 5,519,606 A | 5/1996 | Frid-Nielsen et al. | 364/401 |
| 5,666,530 A * | 9/1997 | Clark et al. | 395/617 |
| 5,666,553 A | 9/1997 | Crozier | 395/803 |
| 5,684,990 A | 11/1997 | Boothby | 395/619 |
| 5,701,423 A | 12/1997 | Crozier | 395/335 |
| 5,710,922 A | 1/1998 | Alley et al. | 395/617 |
| 5,727,202 A * | 3/1998 | Kucala | 395/610 |
| 5,729,735 A | 3/1998 | Meyering | 395/610 |
| 5,758,150 A * | 5/1998 | Bell et al. | 395/610 |
| 5,758,355 A | 5/1998 | Buchanan | 707/201 |
| 5,778,346 A | 7/1998 | Frid-Nielsen et al. | 705/9 |
| 5,778,389 A * | 7/1998 | Pruett et al. | 707/204 |
| 5,832,487 A | 11/1998 | Olds et al. | 707/10 |
| 5,845,293 A * | 12/1998 | Veghte et al. | 707/202 |
| 5,884,323 A | 3/1999 | Hawkins et al. | 707/201 |
| 6,212,529 B1 * | 4/2001 | Boothby et al. | 707/201 |
| 6,289,357 B1 * | 9/2001 | Parker | 707/202 |
| 6,295,541 B1 * | 9/2001 | Bodnar et al. | 707/203 |

* cited by examiner

Primary Examiner—James P. Trammell
Assistant Examiner—Mary Wang
(74) Attorney, Agent, or Firm—C. George Yu; Darryl A. Smith

(57) ABSTRACT

Synchronization of databases is made to allows use of already-received changes in target datasets even if the synchronization session fails, and even before the failed synchronization session is re-performed or resumed to completion. Further, already-received changes received in a synchronization session are handled such that the need to re-send them in a subsequent synchronization session is minimized, even if the present synchronization should fail before completion. In synchronizing datasets to a reference dataset, after receipt of some number of changes from a dataset, changes are propagated into the reference dataset, to the extent that they can be reconciled with the reference dataset, without requiring that all changes from the dataset have already been received.

19 Claims, 10 Drawing Sheets

| Table 1 -- Preparing for Synchronization |||||
|---|---|---|---|---|
| Time | Client Accessor || Synchronizer Core ||
| | Send | Receive | Send | Receive |
| 1 | Login | | | |
| 2 | | | | Login |
| 3 | | | LoginResponse | |
| 4 | | LoginResponse | | |

*FIG. 7A*

| Table 2 -- Sending Changes From Client to Synchronizer Core |||||
|---|---|---|---|---|
| Time | Client Accessor || Synchronizer Core ||
| | Send | Receive | Send | Receive |
| 5 | UpdateRecord | | | |
| 6 | | | | UpdateRecord |
| 7 | UpdateRecord | | | |
| 8 | | | | UpdateRecord |
| 9 | LastRecordSent | | | |
| 10 | | | | LastRecordSent |
| 11 | | | AckLastRecSent | |
| 12 | | AckLastRecSent | | |

*FIG. 7B*

| Time | Client Accessor | | Synchronizer Core | |
|---|---|---|---|---|
| | Send | Receive | Send | Receive |
| 13 | RetrieveRecords | | | |
| 14 | | | | RetrieveRecords |
| 15 | | | DeleteRecord | |
| 16 | | DeleteRecord | | |
| 17 | | | InsertRecord | |
| 18 | | InsertRecord | | |
| 19 | | | UpdateRecord | |
| 20 | | UpdateRecord | | |
| 21 | | | LastRecordSent | |
| 22 | | LastRecordSent | | |
| 23 | AckLastRecSent | | | |
| 24 | | | | AckLastRecSent |

Table 3 -- Sending Changes From Synchronizer Core to Client

*FIG. 7C*

| Table 4 -- Wrapping Up the Synchronization |||||
|---|---|---|---|---|
| Time | Client Accessor || Synchronizer Core ||
| | Send | Receive | Send | Receive |
| 25 | UpdateMap | | | |
| 26 | | | | UpdateMap |
| 27 | LastMapSent | | | |
| 28 | | | | LastMapSent |
| 29 | | | AckLastMapSent | |
| 30 | | AckLastMapSent | | |
| 31 | Logout | | | |
| 32 | | | | Logout |

*FIG. 7D*

SYSTEM AND METHODS FOR ROBUST SYNCHRONIZATION OF DATASETS

RELATED APPLICATIONS

The present application is related to and claims the benefit of priority from the following commonly-owned U.S. patent applications, the disclosures of which are hereby incorporated by reference in their entirety, including any appendices or attachments thereof, for all purposes: Ser. No. 60/109,983, filed Nov. 25, 1998, and entitled SYSTEM AND METHODS FOR TRANSACTION-BASED SYNCHRONIZATION; and Ser. No. 60/106,189, filed Oct. 28, 1998, and entitled SYSTEM AND METHOD FOR TRANSACTION-BASED SYNCHRONIZATION.

The present application is also related to the following commonly-owned U.S. patent applications, the disclosures of which are hereby incorporated by reference in their entirety, including any appendices or attachments thereof, for all purposes: Ser. No. 09/136,215, filed Aug. 18, 1998, and entitled SYSTEM AND METHODS FOR SYNCHRONIZING TWO OR MORE DATASETS; Ser. No. 09/136,212, filed Aug. 18, 1998, and entitled DATA PROCESSING ENVIRONMENT WITH METHODS PROVIDING CONTEMPORANEOUS SYNCHRONIZATION OF TWO OR MORE CLIENTS; Ser. No. 60/094,972, filed Jul. 31, 1998, and entitled SYSTEM AND METHODS FOR SYNCHRONIZING TWO OR MORE DATASETS; Ser. No. 60/094,824, filed Jul. 31, 1998, and entitled DATA PROCESSING ENVIRONMENT WITH METHODS PROVIDING CONTEMPORANEOUS SYNCHRONIZATION OF TWO OR MORE CLIENTS; and Ser. No. 60/069,731, filed Dec. 16, 1997, and entitled DATA PROCESSING ENVIRONMENT WITH SYNCHRONIZATION METHODS EMPLOYING A UNIFICATION DATABASE.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to management of information or datasets stored on information devices and, more particularly, to systems implementing methods for maintaining synchronization of datasets among such devices.

With each passing day, there is ever increasing interest in providing synchronization solutions for connected information devices (CIDs). Here, the general environment includes CID in the form of electronic devices including, for example, cellular phones, pagers, other hand-held devices (for example, REX PRO™, PalmPilot and Windows CE devices), personal computers (PCs) of all types and sizes, and Internet or intranet access devices (for example, PCs or embedded computers running, for example, Java virtual machines or browsers or Internet Protocol (IP) handlers).

A problem found in such an environment today is that these devices, and the software applications running on these devices, do not communicate well with one another and are typically not designed with data synchronization in mind. In particular, a problem exists as to how one integrates information—such as calendaring, scheduling, and contact information—among disparate devices and software applications. Consider, for instance, a user who has his or her appointments on a desktop PC at work, but also has appointments on a notebook computer at home and on a battery-powered, hand-held device that is used in the field. The user is free to alter such information on any one of these devices. What the user really wants is for the information (for example, appointments), in each device to remain synchronized with corresponding information in all devices in a convenient, transparent manner. Still further, some devices (for example, PCs) are typically connected at least occasionally to a server computer, for example, an Internet server, which stores information for the user. The user would of course like the information on the server computer to participate in the synchronization, so that the server also remains synchronized.

There have been attempts to solve the problem of synchronizing datasets across different devices or software applications, even if the datasets were not designed with mutual synchronization in mind. An early approach to maintaining consistency between datasets was simply to import or copy one dataset on top of another. This simple approach, one which overwrites a target dataset without any attempt at reconciling any differences, is inadequate for all but the simplest of applications. Expectedly, more sophisticated synchronization techniques were developed. In particular, techniques were developed for attempting to reproduce in each dataset the changes found in other dataset (s) since a previous synchronization. Techniques were developed for resolving any conflicts involving such changes, automatically or with user assistance. Some earlier examples of such techniques were limited to "point-to-point" synchronization, in which exactly two datasets are synchronized. Later, "multi-point" techniques were developed by Starfish Software, Inc. ("Starfish"), the present assignee, that are capable of synchronizing arbitrarily many datasets using a single synchronization system or in response to a single interaction with a user. Starfish's synchronization techniques are described for example in U.S. patent application Ser. No. 09/136,215, which has been incorporated by reference. Starfish's synchronization systems may be implemented on server computers, such as an Internet server, to provide synchronization services to remotely located datasets, provided that the proper accessors for interfacing with datasets are available. A version of Starfish's Internet-based synchronization system is called the TrueSync® Server, or "TSS". (TrueSync® is a registered trademark of Starfish. REX™ and REX PRO™ are trademarks of Franklin Electronic Publishers of Burlington, N.J. REX and REX PRO devices include licensed technology from Starfish.)

A limitation of the existing synchronization systems is that they do not handle interrupted synchronization sessions in an efficient or always-desirable manner. This can be a problem, especially if the connection to a particular dataset is broken during a synchronization session, for example, due to a failure in the communication channel. If a synchronization is interrupted, much of the synchronization work that has already been performed cannot easily be used and is discarded. One bad consequence is that the user is typically forced to repeat an entire, time-consuming synchronization session with the dataset from the beginning, instead of being able to resume largely from where the previous session ended. Another bad consequence is that even though many dataset changes from the dataset may have already been tediously received and processed prior to the breaking of the connection, the user cannot immediately use these many dataset changes in other datasets. Instead, the user is generally forced to wait until the connection is restored and a full synchronization session with the particular dataset is repeated or re-performed. To some degree, users may be willing to tolerate such inconveniences when using synchronization systems (for example, PC-based implementations) that primarily use relatively reliable connection means, such as direct serial-line or PC-Card connections, to datasets. However, as information appliances increasingly use ever more diverse and potentially less reliable ways of connecting to synchronization systems, these inconveniences become less tolerable.

It is helpful to examine the above-identified deficiencies of existing synchronization systems in more detail. During a synchronization session, an existing synchronization system typically determines the changes that have occurred in a dataset, for example a PalmPilot organizer's dataset, since a prior synchronization. After the synchronization session, the changes have been propagated by the synchronization system into other, target dataset(s) for use. These target dataset(s) may include ordinary user datasets, for example a PC-based PIM application. These target dataset(s) also may include a central-repository dataset controlled by the synchronization system itself, which dataset is sometimes referred to as the GUD, or Grand Unification Database. The problem with existing synchronization systems is that if a connection to a dataset being synchronized is broken during a synchronization session, any partial set of changes from the dataset that have already been seen or processed prior to the connection failure is not yet integrated into the target dataset(s). Therefore, the partial set of already-seen changes cannot be used in the target dataset(s) for user viewing or in other synchronization sessions. Further, the partial set of received changes generally cannot even easily be used, after the connection is restored, for resuming synchronization with the same particular dataset from roughly where the interrupted session left off. This "all-or-nothing" approach with regard to making received changes available can cause significant delay and waste of resources. The inconvenience is especially likely and objectionable when synchronizing with datasets that connect to the synchronization system using frequently-broken or undependable connections, such as Internet-based or other remote connections. Further, the inconvenience is especially likely and objectionable when the synchronization session is long, for example because the dataset(s) being synchronized are large or because many datasets are being synchronized in a single (multi-point) session.

What is needed are systems and techniques that allow use of already-received changes in target datasets even if the synchronization session fails, and even before the failed synchronization session is re-performed or resumed to completion. What is also needed are systems and techniques for synchronization that minimize the need to repeat already-performed work after an interrupted synchronization session.

The present invention fulfills these and other needs.

SUMMARY OF THE INVENTION

The present invention makes possible synchronization of databases in a manner that allows use of already-received changes in target datasets even if the synchronization session fails, and even before the failed synchronization session is re-performed or resumed to completion. The present invention also makes possible synchronization of databases in a manner that minimizes the need to re-send dataset changes that have already been sent in an earlier, failed synchronization session.

According to an embodiment of the invention, a method is provided for synchronizing at least a first dataset and a second dataset, from a plurality of datasets, with a reference dataset, wherein a plurality of changes have been made to the first dataset since a previous synchronization of the first dataset with the reference dataset. According to the method, a description is stored of correspondence between data records of the reference dataset to data records of each of the plurality of datasets. Further, at least a first change of the plurality of changes is received from the first dataset for possible propagation to the reference dataset. After the receipt of the first change, the first change is propagated into the reference dataset, to the extent that the first change can be reconciled with the reference dataset, without requiring that all of the plurality of changes have already been received for possible propagation to the reference dataset. Any remaining changes of the plurality of changes, and any changes that have been made to the second dataset since a previous synchronization of the second dataset, are also propagated into the reference dataset, to the extent that such changes can be reconciled with the reference dataset. Additionally, changes are propagated to the first and the second dataset from the reference dataset, to the extent that such changes are not present at the first and the second dataset.

BRIEF DESCRIPTION OF THE DRAWINGS

FIGS. 7A–D together summarize a single communication sequence, between a client accessor and the Synchronizer core, during a synchronization session using the method of FIG. 5.

DETAILED DESCRIPTION OF SPECIFIC EMBODIMENTS

A. The Synchronization System (for example, the True-Sync® Server)

1. Introduction

Figure 1:
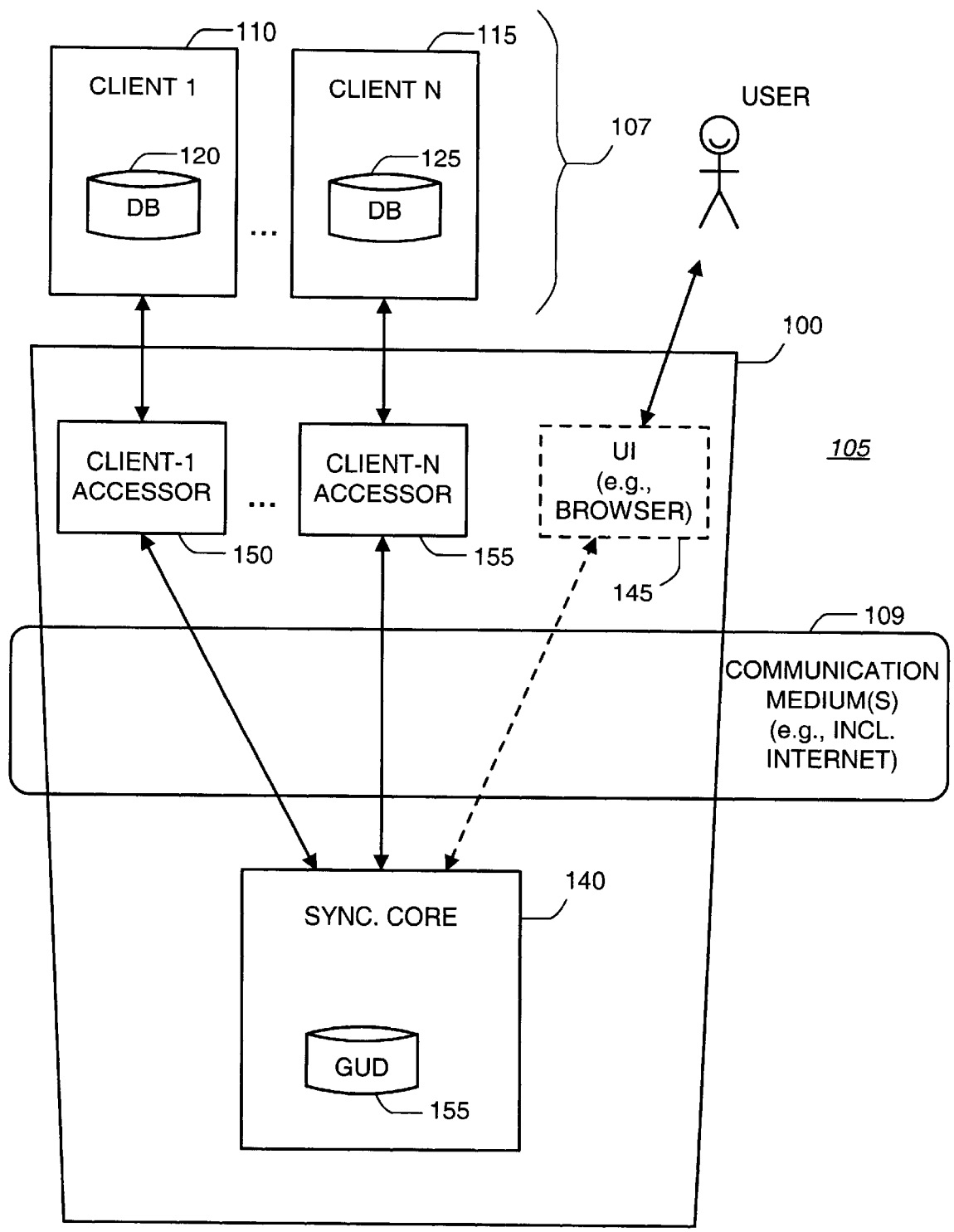
FIG. 1 is a block diagram that shows the synchronization system ("Synchronizer") according to an embodiment of the present invention.

FIG. 1 is a block diagram that shows a synchronization system 100 ("Synchronizer") according to an embodiment (for example, the TSS) of the present invention in an example environment 105. The environment 105 includes communication mediums 109 and a number of synchronization clients 107. The synchronization clients 107 include user datasets and may participate in synchronization. Examples of possible clients 107 include the PalmPilot organizer, the REX™ organizer, and PIM software applications such as Starfish's Sidekick® or Microsoft Outlook. (Sidekick® is a registered trademark of Starfish.) As shown, the clients 107 include a first synchronization client 110 and an N-th synchronization client 115 that respectively include a dataset 120 and a dataset 125. The communication mediums 109 may include, for example, the Internet, or wire-line and wireless channels of all types.

The Synchronizer 100 includes a Synchronizer core 140, an optional User Interface 145 (UI), and client accessors including for example a first client's accessor 150 and an N-th client's accessor 155. Each client accessor includes sufficient knowledge (e.g., client-specific knowledge) to enable the accessor to access (for example, read and write) information on a client's dataset and to communication such information to and from the Synchronizer core 140, via the communication mediums 109. Each client accessor may run on a same machine as the client, e.g., on a remote machine from the Synchronizer core. Information stored by a client accessor may be stored on the accessor's local machine for efficiency, or may be stored with the Synchronizer core and accessed by the accessor via its connection with the Synchronizer core. The Synchronizer core 140 includes and controls its own reference dataset 155, which is sometimes called the GUD, or Grand Unification Dataset. The GUD is for storing a super-set of data from all datasets. Together, the Synchronizer core 140 and the client accessors manage the synchronization process. The optional UI 145 provides optional interactive input and output to a user during the synchronization process. The UI optionally includes a browser or terminal or similar user interface technology and enables the user to view or modify the information in the GUD to thereby provide PIM functionality using the GUD.

As shown, the Synchronizer of FIG. 1 resembles other Starfish synchronization system(s) as described, for example, in the incorporated U.S. patent application Ser. No. 09/136,215. In general, the present invention is built on a similar architecture as other Starfish synchronization system (s), and reference may be made to the incorporated patent application Ser. No. 09/136,215 for general details underlying the present invention. For example, the present invention preferably includes the modular "plug-in" architectural features that are described in the incorporated U.S. application Ser. No. 09/136,215. However, the Synchronizer of the present invention is programmed to use the synchronization methods to be described, which are capable of recovering efficiently from interrupted synchronization sessions and allow usage of already-received changes in the event of such interruptions even before the synchronization session is repeated or resumed to completion.

2. System Hardware

Figure 2A:
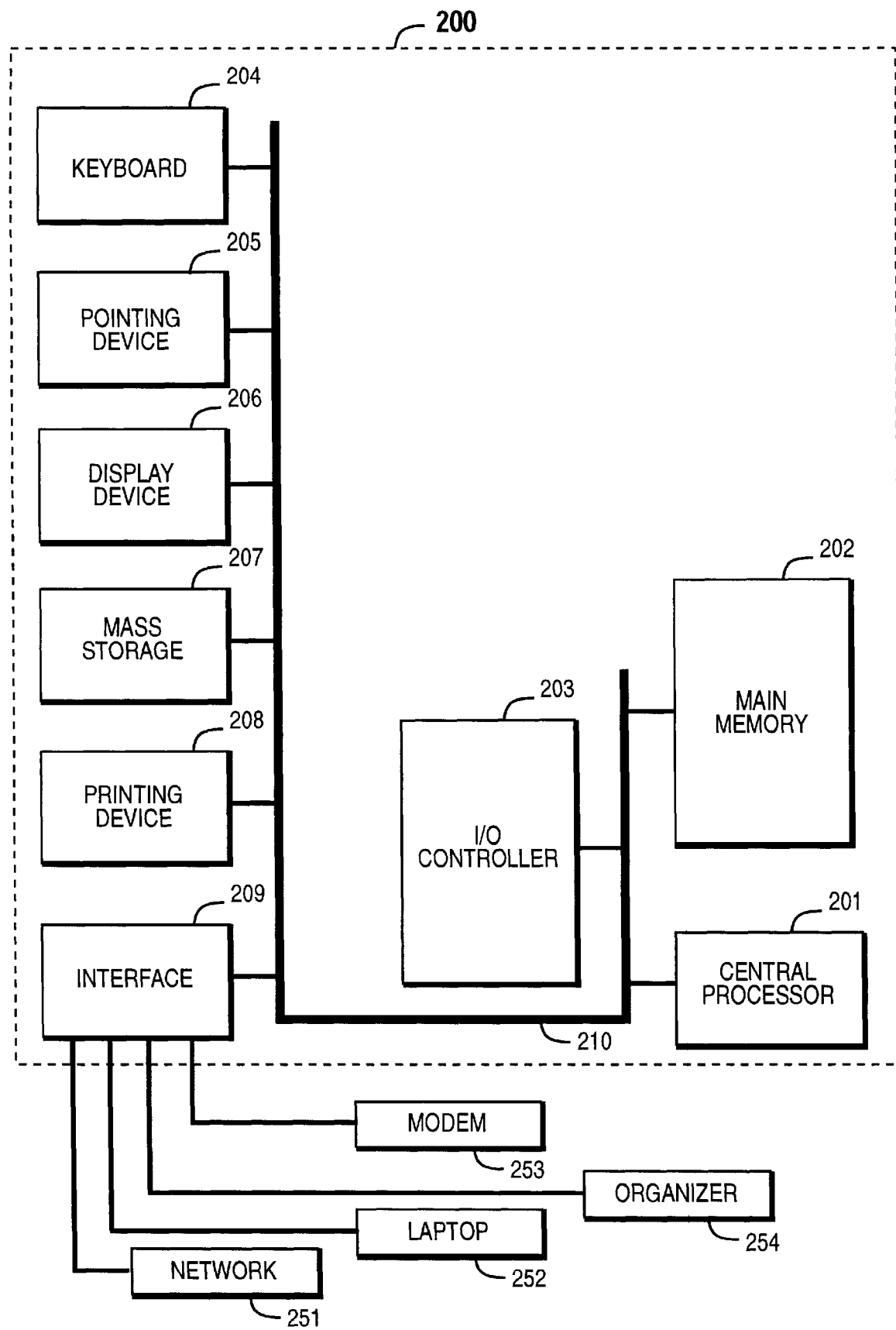
FIG. 2A is a block diagram of a computer system in which the present invention may be embodied.

The present invention may be embodied on an information processing system such as the system 200 of FIG. 2A, which comprises a central processor 201, a main memory 202, an input/output (I/O) controller 203, a keyboard 204, a pointing device 205, pen device (or the like), a screen or display device 206, a mass storage 207 (for example, hard disk, removable floppy disk, optical disk, magneto-optical disk, or flash memory, etc.), one or more optional output device(s) 208, and an interface 209. Although not shown separately, a real-time system clock is included with the system 200, in a conventional manner. The various components of the system 200 communicate through a system bus 210 or similar architecture. In addition, the system 200 may communicate with other devices through the interface or communication port 209, which may be an RS-232 serial port or the like. Devices which will be commonly connected to the interface 209 include a network 251 (for example, LANs or the Internet), a laptop 252, a handheld organizer 254 (for example, the REX PRO™ organizer, available from Franklin Electronic Publishers), a modem 253, and the like.

In operation, program logic (implementing the methodology described below) is loaded from the storage device or mass storage 207 into the main memory 202, for execution by the processor 201. During operation of the program (logic), the user enters commands through the keyboard 204 and/or pointing device 205 which is typically a mouse, a track ball, or the like. The computer system displays text and/or graphic images and other data on the display device 206, such as a cathode-ray tube or an LCD display. A hard copy of the displayed information, or other information within the system 200, may be obtained from the output device 208 (for example, a printer). In an embodiment, the computer system 200 includes an IBM PC-compatible personal computer (available from a variety of vendors, including IBM of Armonk, N.Y.) running Windows 9x or Windows NT (available from Microsoft Corporation of Redmond, Wash.). In a preferred embodiment, the system 200 is an Internet or intranet or other type of network server and receives input from and sends output to a remote user via the interface 209 according to standard techniques and protocols.

3. System Software

Figure 2B:
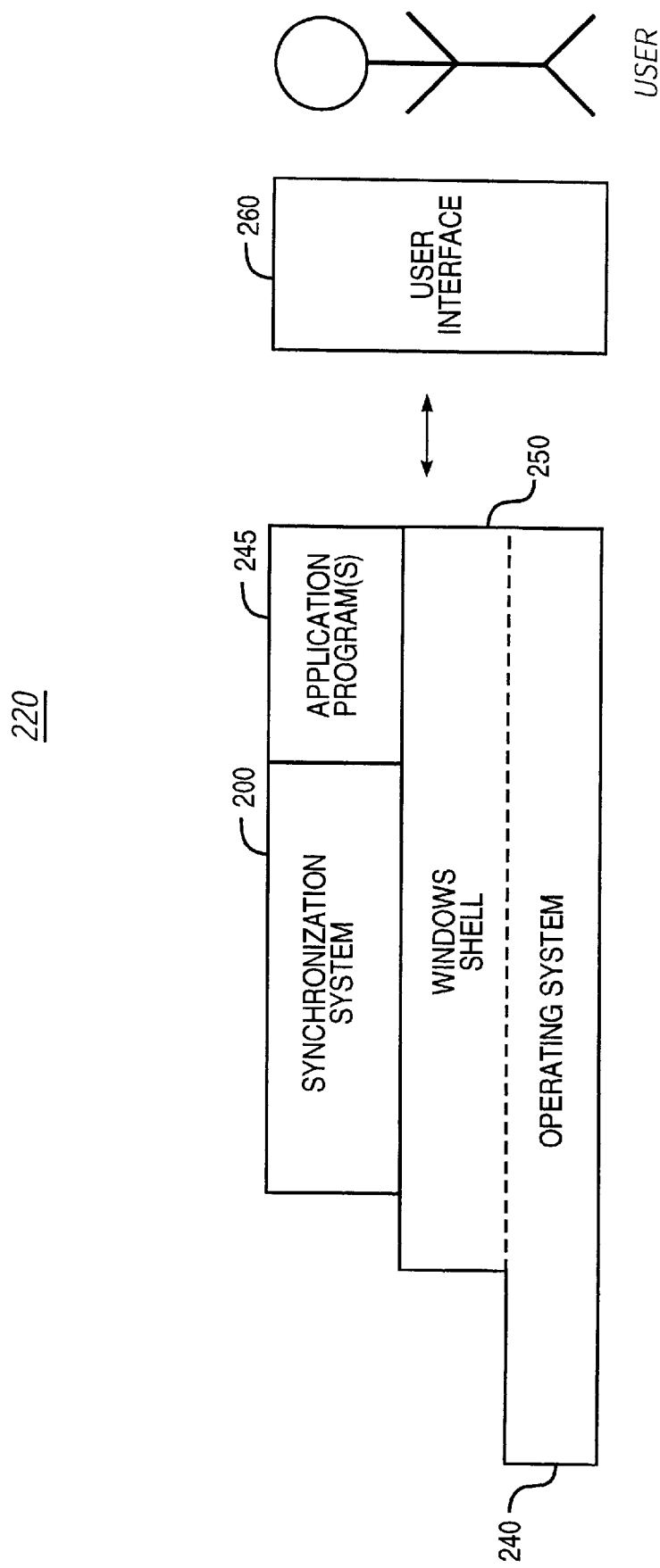
FIG. 2B is a block diagram of a software system of the present invention for controlling operation of the system of FIG. 2A.

Illustrated in FIG. 2B, a computer software system 220 is provided for directing the operation of the computer system 200. Software system 220, which is stored in system memory 202 and on storage (for example, disk memory) 207, includes a kernel or operating system (OS) 240 and a windows shell 250. One or more application programs, such as client application software or "programs" 245 may be "loaded" (i.e., transferred from storage 207 into memory 202) for execution by the system 200.

System 220 typically includes an optional user interface (UI) 260, preferably a Graphical User Interface (GUI), for receiving user commands and data and for producing output to the user. These inputs, in turn, may be acted upon by the system 200 in accordance with instructions from operating system module 240, windows module 250, and/or client application module(s) 245. The UI 260 also serves to display the user prompts and results of operation from the OS 240, windows 250, and application(s) 245, whereupon the user may supply additional inputs or terminate the session. In one embodiment, OS 240 and windows 245 together comprise Microsoft Windows software (for example, Windows 9x or Windows NT). Although shown conceptually as a separate module, the UI is typically provided by interaction of the application modules with the windows shell and the OS 240. One application program 200 is the Synchronizer according to embodiments of the present invention, which will now be described in further detail. In the preferred embodiment, OS 240 is part of an Internet server, and the UI 260 is provided at a remote computer via the Internet using standard Internet protocols.

4. System Architecture

Figure 3:
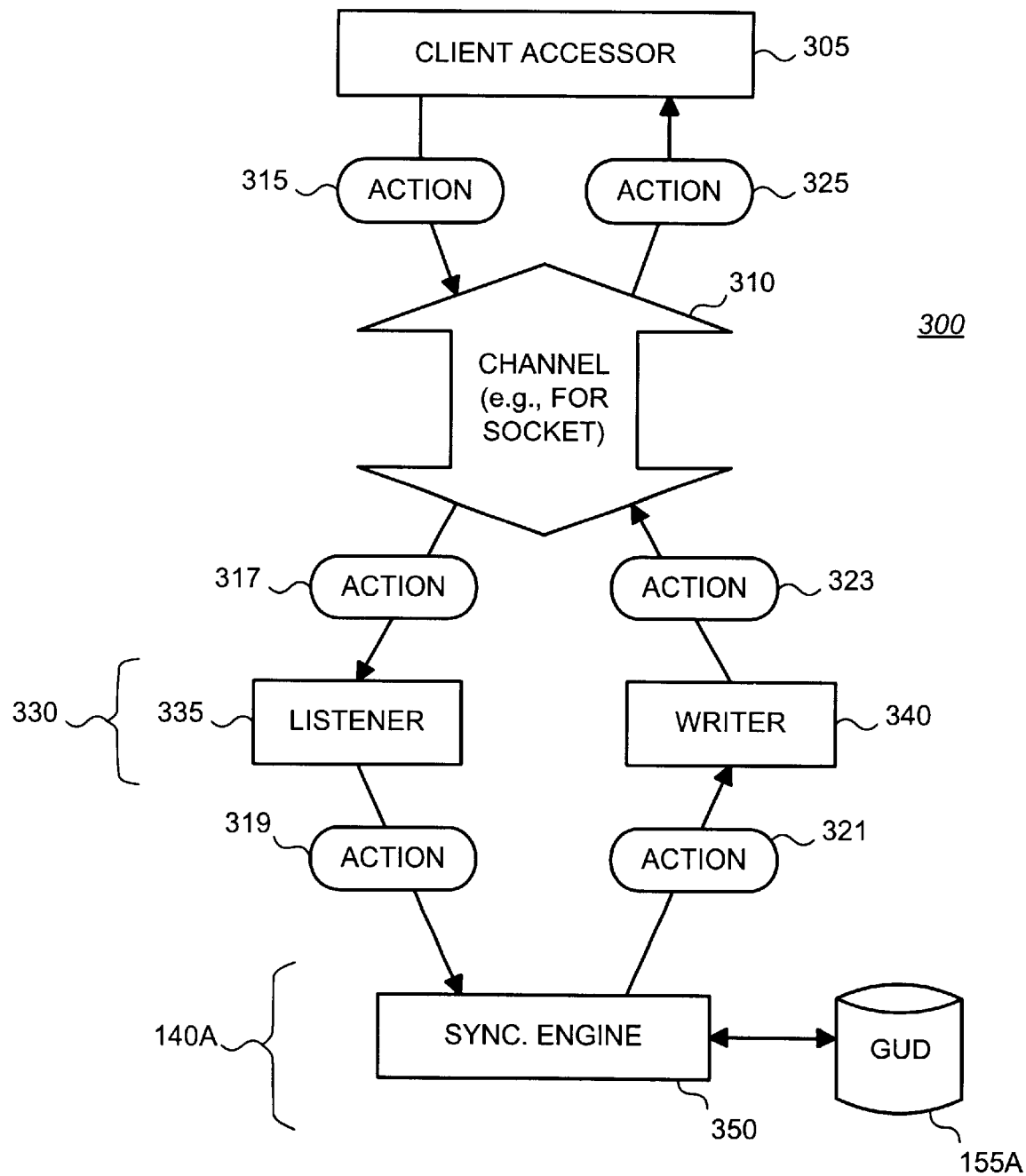
FIG. 3 is a block diagram that shows the architecture of a Synchronizer according to an embodiment of the invention.

FIG. 3 is a block diagram that shows the architecture of a Synchronizer 300 according to embodiments of the invention. In the preferred embodiment, the Synchronizer 300 is an Internet-based synchronization server (for example, the TSS). The Synchronizer 300 includes a client accessor 305 and a Synchronizer core 140A which communicate with each other by exchanging "action objects" 315, 317, 319, 321, 323, and 325 via a communication channel 310 that is found in the environment of the Synchronizer and via a communication layer 330 that is used by the Synchronizer core 140A. In the preferred, Internet-based embodiment, the communication channel 310 supports and includes socket connections that are opened between nodes on the Internet to provide communication. The client accessor 305 handles access to information in a particular client dataset (not shown) and handles delivery and receipt of information across the communication channel 310 on the client side. The communication layer 330 handles delivery and receipt of information across the channel 310 on the Synchronizer core's side. The communication layer 330 includes a listener 335 for receiving and unpackaging (e.g., deserializing) information from the communication channel 310 and a writer 340 for packaging and sending information onto the communication channel 310. The Synchronizer core 140A includes a GUD 155A that stores a super-set of information from all other datasets as a central repository of information, including not only the latest values of data records but also status information, including the correspondence, or mapping, of records in the GUD to records in other datasets. The Synchronizer core also includes a Synchronizer engine 350 that controls and maintains the GUD and works with all client accessors to collectively drive and control the synchronization process. Reference may be made to the incorporated patent application Ser. No. 09/136,215 for other details underlying the present invention, including details about the GUD and the means for establishing a mapping of records and record fields across datasets.

Preferably, the client accessor 305 exists as a software process that runs on a same device as the particular client dataset. Preferably, the listener 335 and the writer 340 exist as individual software processes on the Synchronizer engine's side of the channel 310. The action objects 319 and 321 that are used by the Synchronizer core 140A for communicating with the client accessors such as the accessor 305 will be further described in a later section. For now, it is sufficient to mention that action objects are a defined format for conveying dataset changes and other information between the Synchronizer core and client accessors, in either direction. The action objects 315, 317, 323, and 325 are action objects that have been packaged (for example, serialized) for transport across the communication channel 310.

B. Method for Basic Synchronization

A base synchronization method that may be used by the Synchronizer is described in this section, including this section's subsections. In later sections, improved synchronization methods according to the present invention will be described.

1. Overview

The base synchronization method is suitable for synchronizing datasets, even datasets that were independently developed for independent operation without mutual synchronization in mind. The base synchronization method assumes that existing methods have already been used, or will be used, to establish a correspondence, or mapping, between records and record fields in the user's dataset(s) and records and record fields in the GUD. For example, a "John Robert Smith of Acme, Inc." contact record in a first dataset either is or will be determined to correspond to a "John Robert Smith of Acme, Inc." contact record in a second dataset. For another example, a record fields entitled "Work Phone Number" for contact records in the first dataset is or will be determined to correspond to a record field entitled "business Phone" for contact records in the second dataset. The existing techniques for mapping records and record fields are further described for example in the incorporated U.S. patent application Ser. No. 09/136,215.

Figure 4:
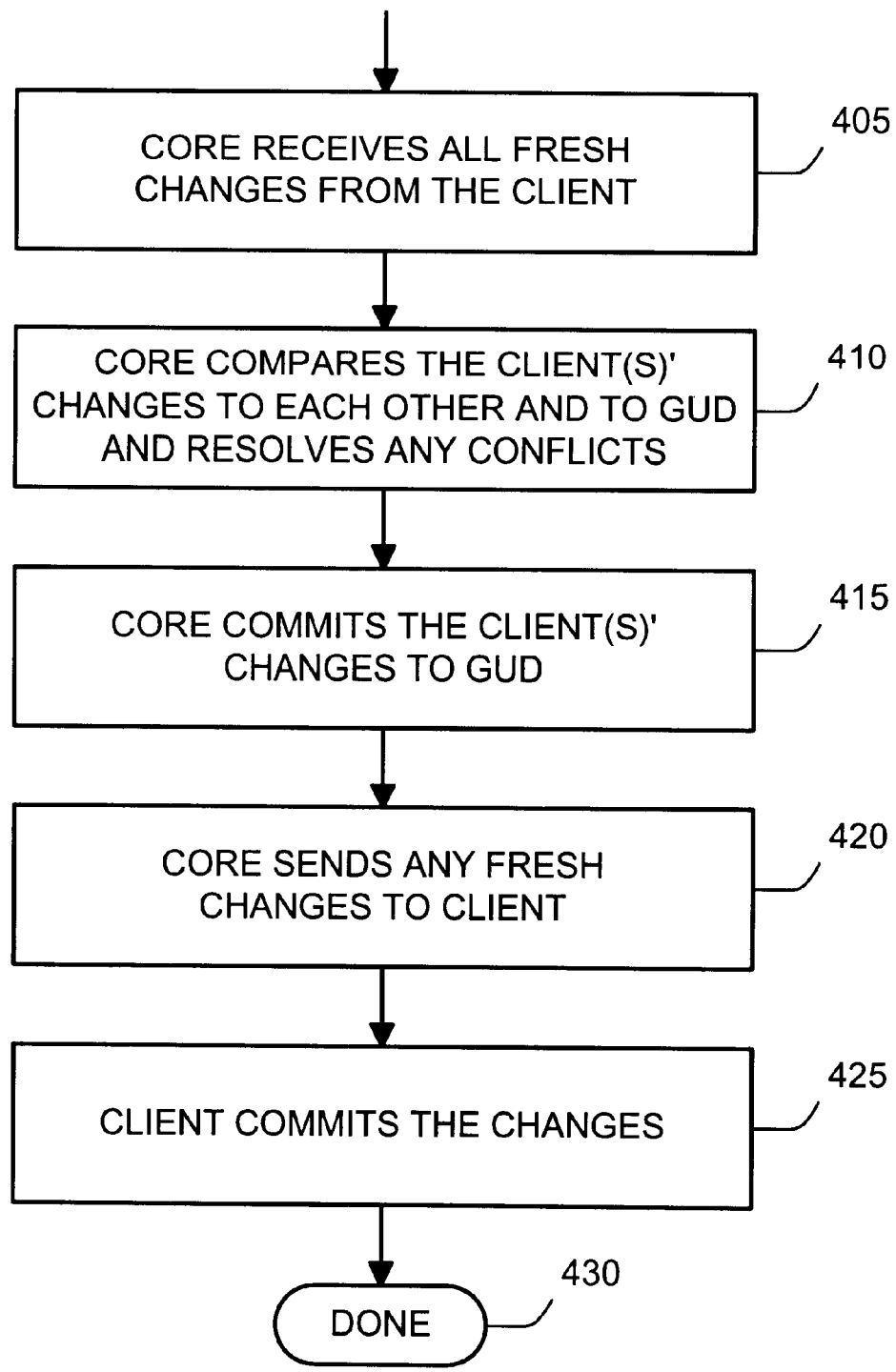
FIG. 4 is a flowchart that describes a base synchronization method.

FIG. 4 is a flowchart that describes the base synchronization method 400 that may be used by the Synchronizer. In FIG. 4 and the remaining description, "TSS" may be used to refer to the Synchronizer, but it is to be understood that, unless otherwise stated or context demands otherwise, such description is not necessarily limited to the preferred, TSS embodiment but rather applies to all embodiments of the present invention. The base synchronization method includes steps 405, 410, 415, 420, 425, and 430, which implement a binary synchronization between a single dataset and the GUD.

In the step 405, the TSS core receives from a client accessor (henceforth, simply "client" for convenience) all of that client's changes that are "fresh" with respect to the TSS core—i.e., all its changes that have not yet been seen by the TSS core. In the method 400, fresh changes include all changes in the client made since the previous synchronization involving the client. In the step 410, after all fresh changes from the client has been collected, the TSS core compares the client's changes to the GUD and resolves any conflicts, either automatically or with user-assistance. Next, in the step 415, the TSS core commits the client's (conflict-resolved) changes into the GUD. Then, in the step 420, the TSS core sends any changes that are fresh with respect to the client to the client. Next, the synchronization is finished at the step 430.

The steps of the method 400 are further described immediately below. In addition to the following description, it may be helpful to refer to the incorporated patent application Ser. No. 09/136,215, which includes discussion of synchronization concepts and methods which may be applicable to the method 400.

2. Receiving Fresh Client Changes The client performs the step 405 (sending fresh changes) by sending information regarding all deletions, updates, and insertions since the previous synchronization ("sync") with the TSS. Preferably, the client keeps track of the time of its last synchronization with the TSS. (Otherwise, the client can get the last synchronization from the TSS core, which does keep track.) Preferably, the client maintains a last-modification timestamp for each record. Preferably the client keeps track of the IDs (client's native unique identifiers) of records deleted since the last sync with the TSS.

The client determines and sends to the TSS core an indication of the identities of deleted records, for example, as follows:

1) if the client keeps track of fresh deletions, sending IDs of records that were deleted after the last sync, along with the deletion time of the records if available. This may be implemented for example, in a client that keeps track of deleted records and delete times, by comparing delete times to the time of the client's last sync with the TSS.

2) otherwise, sending the IDs of all existing client records to the TSS core, whereupon the TSS core can determine the deleted records by identifying the client IDs that are missing from the sent list, as compared to a list stored in the GUD (in a "mapping table") of client IDs of the client's records that were in existence at the end of the previous synchronization.

The client determines modified records and added records, for example, as follows:

1) if the client keeps last-modification times of records, then if the last modification time of any record exceeds the time of the last synchronization with the TSS, then that record is either an added or updated record (the client doesn't need to worry exactly which type it is), and the client sends the record's data to the TSS core along with the record's priority time (which may simply be the client record's last modification time, since clients generally do not keep separate priority times and last-modification times).

2) otherwise, the client sends CRC-type values (Cyclic Redundancy Check-type values) corresponding to the entire record for all records to the TSS core so that the TSS core can compare with the CRC-type values that were recorded for the client's records at the end of the previous synchronization.

3. Conflict Resolution

The TSS core performs the step 410 (Conflict Resolution), for example, as follows:

1) for a fresh record deletion received from the client:
   A) if the corresponding GUD record is already deleted, ignore the client's deletion, but if the client supplied a client deletion time and that deletion time is later than the GUD record's priority deletion time, replace the GUD record's priority deletion time with the client's deletion time.
   B) otherwise, if the latest priority time for the corresponding GUD record is later than the delete time for the client's deleted record (or later than the last sync time, if delete time is unavailable), then ignore the client's deletion and mark the GUD record for later propagation (in the step 420) to the client as an addition.
   C) otherwise, mark the corresponding GUD record for deletion.

2) for a modified or added record from the client:
   A) if no corresponding GUD record exists, add the record into the GUD.
   B) if a corresponding GUD record exists, compare the priority times of the client record and the GUD records to determine a winner for each field and merge the records, with the winning priority time(s) becoming the priority time of the merged record. (Preferably, field-by-field priorities are kept in the GUD and are used by the TSS in merging records. Generally, the client's record keeps priority time (e.g., modification time) on a record-level and not a field-level, therefore the single record-level priority time is used as the priority time for all the client record's fields.)

C. Improved Synchronization Method For Making Changes Immediately Available

1. Incremental Commitment of Changes

Figure 5:
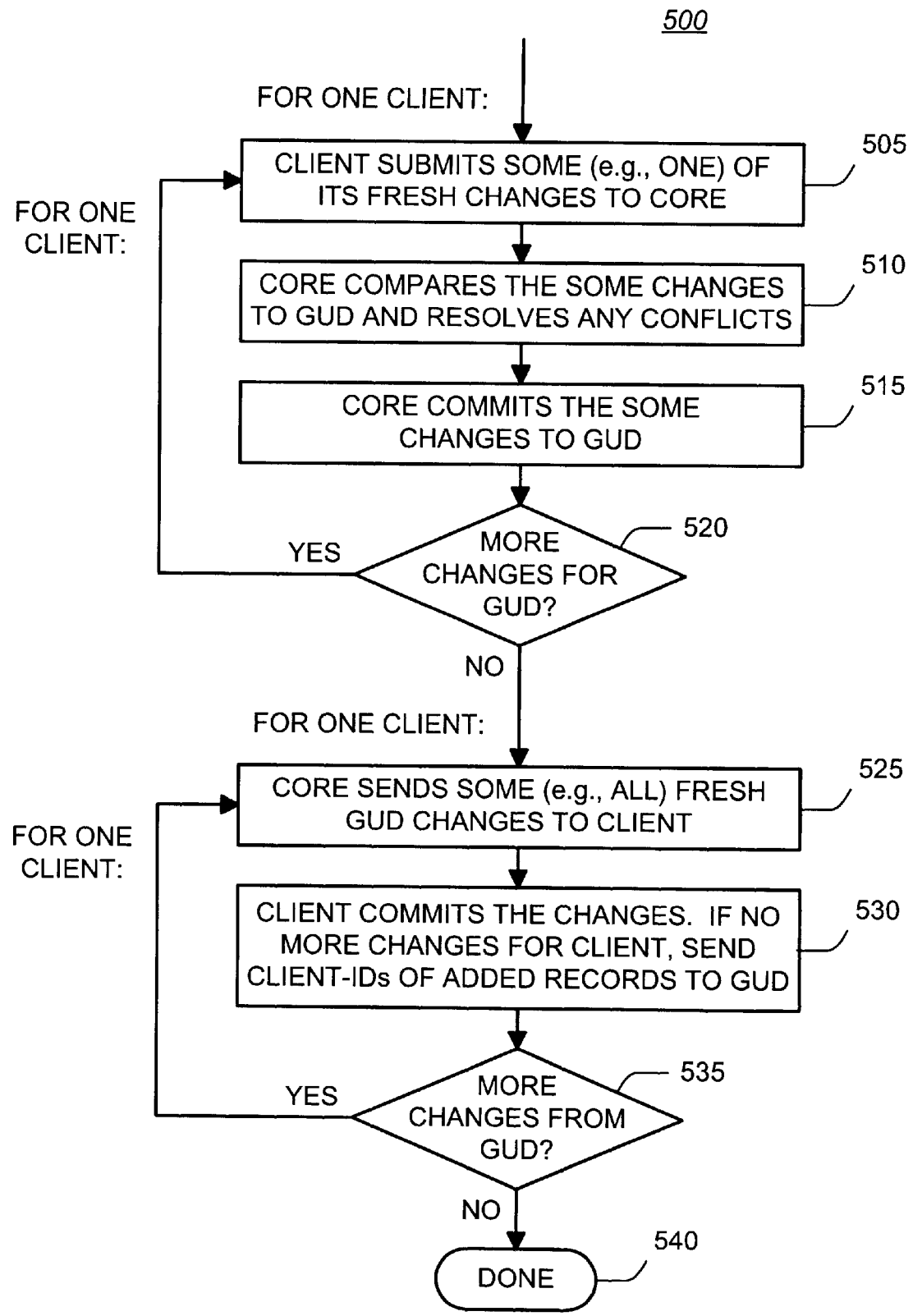
FIG. 5 is a flowchart that describes an improved synchronization method according to the present invention.

FIG. 5 is a flowchart that describes an improved synchronization method 500 that commits changes to the GUD incrementally as they are received from a client, in bunches, without having to first receive all changes from the client. In this way, even if the synchronization is interrupted, already-received changes are already in the GUD and can be easily made available to the user, for example for viewing via a PIM interface (e.g., browser) into the GUD. FIG. 5 and the remaining description may use "TSS" to refer to the Synchronizer, but it is to be understood that FIG. 5 and the following description are not necessarily limited to the preferred, TSS embodiment.

The synchronization method 500 includes steps 505, 510, 515, 520, 525, 530, 535, and 540. In the preferred embodiment, the method 500 is used for synchronizing a single client with the GUD. Once synchronization begins, in the step 505, a client accessor (henceforth, simply "client" for convenience) sends to the TSS core some amount of the client's data changes (if any) that are fresh with respect to the GUD. These fresh changes are changes that were made in the client and that the client has not yet to its knowledge successfully reported to the TSS core. Such sent fresh changes include, for example, at least the updated fields of updated records, some indication of the identities of deleted records, and entire added records. The amount of changes sent in the step 505 need not include all fresh data changes in the client. In one embodiment, the client accessor sends exactly one fresh change (update, deletion, or addition of one record) in the step 505.

In the step 510, the TSS core compares the received client changes to the corresponding data in the GUD and resolves conflicts involving the changes, as earlier described in connection with FIG. 4. Next, in the step 515, the TSS core propagates the received client changes (the portions of which survived conflict resolution) to the GUD. These changes are committed to the GUD and thus will be available to the user, if the synchronization is interrupted.

In general, the client may perform the step 505 again any number of times, via the logical step 520 in FIG. 5, to send additional fresh changes to the TSS core. In response to these additional fresh changes, the TSS core performs the steps 510 and 515 to process and commit the additional changes to the GUD as appropriate. When the client has sent all its changes that are fresh with respect to the GUD, the client indicates to the TSS core that the client is ready to receive changes from the GUD that are fresh with respect to the client (e.g., any changes that were made in the GUD's data since the client's previous synchronization, other than the ones caused by the client itself in, e.g., the current synchronization).

Once the TSS core receives the client's indication that the client is ready to receive fresh changes from the GUD, in the step 520, the TSS core sends such fresh changes to the client in the step 525. In response, in the step 530, the client commits the changes received from the GUD to the client's dataset. Next, still in the step 530, if the client knows it 5 has received all such fresh changes from the GUD for the client, the client sends to the TSS core the client IDs for all new records, if any, that the client has added in committing the fresh changes from the GUD. Preferably, for simplicity, the TSS core sends in the step 520 all fresh changes for the client to the client. In general, though, the TSS core may perform the step 525 multiple times, each time sending just some of the fresh changes for a client to the client. In this way, the client too can perform incremental commitment of changes in the step 530. When the TSS core has sent all fresh changes for the client to the client, it sends an indication of this fact to the client, and the client can respond by sending the client IDs for all new records in the step 530, as described above.

In a particular embodiment of a client accessor, in execution(s) of the step 530 during a single synchronization, the client accessor does not incrementally commit changes to the client dataset. Instead, the client accessor puts all the changes received from the GUD into a buffer, waits until it knows it has received all changes from the GUD, and only after then commits the changes to the client's own dataset. This can be helpful in some circumstances to avoid complexity.

Figure 6:
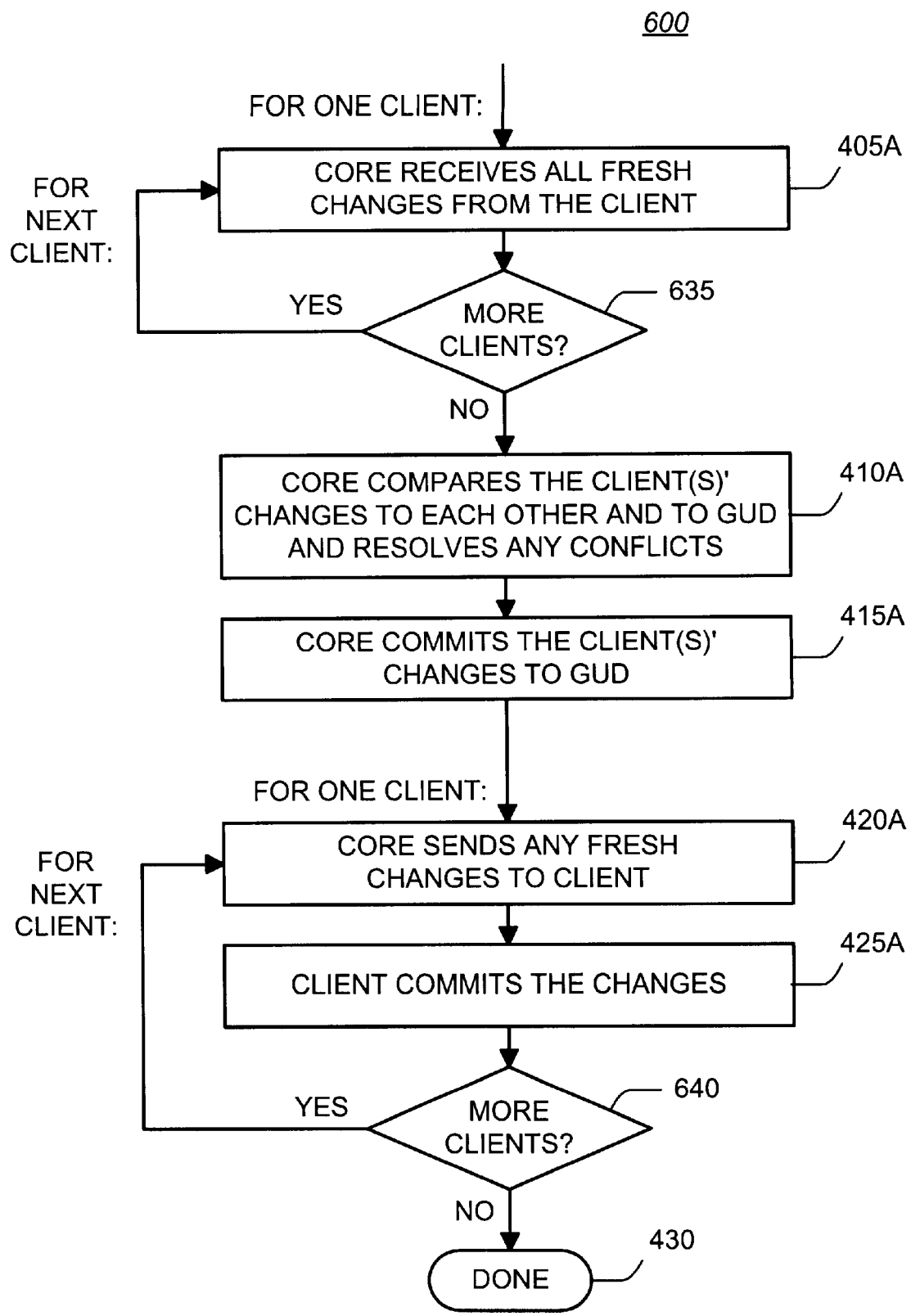
FIG. 6 is a flowchart that describes a base multi-point synchronization method.

2. Adding Multi-Point Capability to Incremental Commitment of Changes a. Multi-Point Synchronization FIG. 6 is a flowchart that describes a base multi-point synchronization method 600. The method 600 resembles the base binary synchronization method 400 of FIG. 4, but differs by being capable of synchronizing an arbitrary number of clients, instead of just one client, with the GUD within a single synchronization session (e.g., in response to a single interaction with the user). The base multi-point method 600 includes steps 405A, 410A, 415A, 420A, 425A, and 430A. These steps are similar to the similarly-numbered steps from the base binary method 400 of FIG. 4. The method 600 additionally includes steps 635 and 640, which make synchronization among an arbitrary number of datasets and the GUD possible, in a same synchronization session.

In the step 405A, the TSS core receives from a client accessor ("client" for convenience) all of that client's changes that are "fresh" with respect to the TSS. In the method 600, fresh changes include all changes in the client made since the previous synchronization involving the client. If the synchronization involves other clients, then all fresh changes from the other clients are also collected via the step 635. In the step 410A, after all fresh changes from all participating clients have been collected, the TSS core compares the client(s)' changes to the GUD or to each other and resolves any conflicts, either automatically or with user-assistance. Next, in the step 415A, the TSS core commits the client(s)' (conflict-resolved) changes into the GUD. Then, in the step 420A, the TSS core sends any changes that are fresh with respect to a client to that client. If the synchronization involves other clients, then any changes that are fresh with respect to each other client is sent to that other client, via the step 640. Next, the synchronization is done at the step 430A.

It may be helpful to refer to the incorporated patent application Ser. No. 09/136,215, which includes discussion of synchronization concepts and methods which may be applicable to the method 600.

b. Multi-Point Sync. with Incremental Commitment of Changes

According to the preferred embodiment of the present invention, the incremental commitment scheme described in FIG. 5 for binary synchronization of one dataset with the GUD is generalized to handle multi-point synchronization of an arbitrary number of datasets. In particular, arbitrarily many clients may send their fresh changes to the TSS core by each executing the step 505 one or more times. In response to each execution of the step 505, the TSS core responds, in the steps 510 and 515, by incrementally committing the received changes to the GUD. The TSS core proceeds to the second phase of the synchronization, beginning with the step 525, after it receives indications from all participating clients in the step 520 that they are ready to receive fresh (to them) changes. Then, the TSS core sends changes that are fresh with respect to each of the participating clients by executing the step 525 one or more times for each client. The synchronization session will be done, in step 540, after the TSS core determines that all changes have been successfully sent to all clients and processed. This determination can be made based on the fact that all clients have sent to the TSS core the client IDs for all new records, if any, that the client has added in committing the fresh changes from the GUD.

D. Detecting and Recovering From Errors To Minimize Lost Work

1. Introduction of Robust Communication Methodology for Error Detection

In the preferred embodiment, the method 500 of FIG. 5 is implemented using a methodology for communication between the client accessor ("client", for convenience) and the Synchronizer core. According to the communication methodology, information is exchanged via transmissions of appropriate Action Objects. Every transmission of an Action Object should be followed, at some point, by some form of acknowledgment from the other side. Without receiving such acknowledgment, the transmitter should not assume that the information has been received, and the transmitter should accordingly abort the synchronization or take other appropriate steps. However, if the transmitter is the client and the transmission is record changes, once such acknowledgment has been received, the client should immediately record that fact such that the client will know not to re-send the successfully-received changes in a later synchronization session, if the current synchronization session should fail to successfully complete. (It is possible for the Synchronizer core, in sending such changes to a client, to similarly record changes that have been acknowledged as received and refrain from re-sending such changes in a later synchronization session, if the present synchronization session should fail. However, in the preferred embodiment, the Synchronizer core does not take this step, in an effort to avoid complexity.) For keeping track of whether data changes have been successfully received by the Synchronizer core, the client preferably maintains a "freshness" indicator for each client data record regarding whether the client data record is still fresh with respect to the GUD (i.e., whether the Synchronizer core positively has seen/received the record's latest value). The freshness indicator may for example include a boolean flag or a timestamp of successful sending.

2. Using the Robust Communication Methodology during Synchronization

A good way to understand the methodology for communicating with Action Objects to execute the method 500 of FIG. 5 is with an example. FIGS. 7A–D are tables that together summarize a single example communication sequence between a client accessor ("client") and the Synchronizer core during a full synchronization session according to an embodiment of the method 500 of FIG. 5. The synchronization session, for example, is for a binary synchronization between the client and the GUD.

a. Preparing for Synchronization

Shown in FIG. 7A, labeled as Table 1, the client initiates a connection (at time 1) with the Synchronizer core and awaits a response form the Synchronizer core. The client receives a response (time 4) sent by the Synchronizer core indicating that a connection has been successfully opened. The connection may be, for example, a socket-based connection over the Internet. Once the connection has been opened, the client proceeds onward with the synchronization, to send its fresh changes to the Synchronizer core, as shown in FIG. 7B.

b. Sending Changes to Synchronizer Core

As shown in FIG. 7B, labeled as Table 2, the client sends a set of fresh changes to the Synchronizer core, in the form of two records that have been updated (times 5 and 7) and then sends a single request (time 9) for confirmation from the Synchronizer core of the receipt of those changes. The Synchronizer core, in response, sends a confirmation object (time 11) that indicates which changes were actually received by the Synchronizer core. For example, the confirmation object may include unambiguous identifiers for the received changes, such as might have been sent by the client as a part of the changes. The client receives the confirmation object (time 12). For the changes that have been acknowledged as received, the client marks the corresponding client record as being no longer fresh with respect to the GUD. In this way, even if the synchronization is later interrupted, the client will not have to resend the received changes to the GUD in a subsequent synchronization. If the client determines that not all of the sent set of changes have been confirmed, then an error has occurred, and the client would take appropriate error-handling action, such as aborting the synchronization. If the client has further set(s) of fresh changes to send to the GUD, then it would send them and await confirmation of their receipt in the same manner as shown for the times 5–13. After all fresh changes have been sent, the next phase of the synchronization continues, as shown in FIG. 7C.

As a technical matter, note that although FIG. 7B shows the second change as being sent by the client (time 7) later than receipt by the Synchronizer core of the first change (time 6) in the set of changes, nothing depends on the actual ordering, and in fact this ordering is not necessarily the ordering obtained in practice. Similarly, the request for confirmation of receipt of a set of changes (shown at time 9) is not necessarily sent by the client later than the receipt of the changes (shown times 8 or 6) by the Synchronizer core, in practice.

C. Receiving Changes from the Synchronizer Core

As shown in FIG. 7C, labeled as Table 3, the client sends an indication (time 13) to the Synchronizer core that the client has no more fresh changes to send and is ready to receive fresh changes from the GUD. In response, the Synchronizer core sends a set of fresh changes (times 15, 17, 19) followed by a request (time 21) for the client to confirm receipt of those changes. The client, in response, sends a confirmation object (time 23) that indicates which changes were actually received by the client. For example, the confirmation object may include unambiguous identifiers for the received changes, such as might have been sent by the Synchronizer core as a part of the changes. The Synchronizer core receives the confirmation object (time 24). If the Synchronizer core determines that not all of the sent set of changes have been confirmed, then an error has occurred, and the Synchronizer core would take appropriate error-handling action, such as aborting the synchronization. If the Synchronizer core has further set(s) of fresh changes to send to the client, then the Synchronizer core would send them and await confirmation of their receipt in the same manner as shown for the times 13–24.

Optionally, for the changes that have been acknowledged (time 24) as having been received, the Synchronizer core marks the corresponding client record as being no longer fresh with respect to the client. In this way, even if the synchronization is later interrupted, the Synchronizer core will not have to resend the received changes to the client in a subsequent synchronization. However, in the preferred embodiment, the Synchronizer core does not make this optimization, in order to avoid complexity. (For instance, the fact that some clients do not incrementally commit changes to client datasets can create complexity.)

If the Synchronizer core has no more fresh changes for the client, it will send a indication of this fact to the client, for example, using a special field in its request for acknowledgment or using a wholly different signal (not shown). In any event, once the client receives this indication, the next phase of the synchronization continues, as shown in FIG. 7D.

d. Ending the Synchronization

Shown in FIG. 7D, the client proceeds to finish the synchronization session by sending (time 25) the client record IDs for records newly added in response to changes from the Synchronizer core so that the Synchronizer core can record the mapping of these new records to their corresponding records in the GUD. (The synchronizer core already has the client IDs of all other client record, either as received within the fresh changes sent by the client during this synchronization or as received in previous synchronizations with the client.) As usual, the client requests confirmation (time 27) of the Synchronizer core's receipt of these record IDs. Once the Synchronizer core supplies such confirmation in response (time 29) and the client receives such confirmation (time 30), the client logs out (time 32), and the synchronization is finished.

3. Catalog of Action Objects Used in the Communication Methodology

Action Objects relevant to synchronization include the following types.

Action Insert Record—This action is only used when the server talks to the client, but is not used when the client talks to the server. The client should use Action Update Record for both new and modified records. When the server sends an Action Insert Record, a temporary record id is passed instead. The client is expected to return a mapping of this temporary record to the one that it assigns it when it is stored, using an Action Update Map record.

Action Update Record—This action, when sent by the client, is used for both a new record and a modified record. When sent from the server to the client, it is only used for updating existing records. The following are special semantics for Action-Update-Record: if the record has a field name repeated, for example two zip fields, only one value will be kept, e.g., the later-appearing one; a record with no fields is an acceptable record, but not necessarily useful; typically, the client sends all the fields mapped for a record, but everything does work if only a subset, for example, only the changed fields, are sent; when there is already an existing record, a field by field merge is done (e.g., by the Synchronizer core), and any field that is newer replaces the existing field from the exiting record, and any fields not mentioned in the update record are retained.

Action Backup Record—This action is similar to Action Update Record, except that it always replaces (i.e., overwrites) any existing record.

Action Delete Record—Note that if the deleted record is visible to the recipient, extra work is performed to remove it. If the record doesn't exist, this action is ignored.

Action Existing Record List—The client sends this to the Synchronizer core with a list of existing records. By omission, the list of delete records can be calculated. Note that this is an alternative for clients that don't keep a list of deleted records. This action causes all records in the GUD associated with this client to be deleted that are not on this list.

Action Last Record Sent—This is sent to indicate that the last of one batch of the update, insert, delete, and/or existing record list actions have been sent. When it is sent from the client to the Synchronizer core, the core updates the last synchronization time with the client for the records of the batch of sent actions.

Action Last Backup Sent—This is similar to the last record sent action. However, all records that were mapped to the current client that have not been sent as part of this session are removed. That is, the set of records sent imply that those not sent did not exist, and so are deleted.

Action Acknowledge Last Record Sent—This is the expected response to the last record sent or last backup sent. It should contain a list of all update and delete actions processed before the last record sent or last backup sent. Note that insert actions are not in this list since they have their own response through the update map call.

Action Retrieve Records—This requests that action records be sent for all changes that the client hasn't seen. Note that records that have just been sent by the client will not be sent back, since the Synchronizer core realizes the client already knows about them. If a record has been modified since last time it was sent to the client, it will be sent as an update record action. If a record has never been mapped to the client, it will be sent as an insert record action. If a record was mapped to the client, but has since been deleted, it will be sent as a delete record action. After all the records in a batch have been sent, a last record action is sent.

Action Retrieve Backup—This is a request causes an insert record action to be sent for every record associated with the current client. It is as if no records exist on the client, so every mapped record is sent.

Action Update Map—This record contains pairs of record IDs. These pairs can be sent one per action, or many per a single action. There should be one pair for each action insert record sent from the server. Each pair is the map of the temporary ID sent in the action insert record with the record ID created when the client inserted the record.

Action Last Map Sent—This is sent to indicate that the last update map action has been sent. This causes the overall last synchronization time to the client to be updated.

Action Acknowledge Last Map Sent—This is the sent to acknowledge that the last action map was sent.

4. Example Source Code (Pseudo-Code)

Following is example source code (e.g., pseudo-code) that shows an example implementation of the synchronization method of the present invention. In light of the above discussion, and the comments within the example source code itself, the example source code is self-explanatory.

```
//
// Copyright (c) 1998 Startish Software, Inc. All rights reserved.
//
// main routine for driving a synchronization session
static Boolean doSync (ULong dbCreator, Byte type)
{
    // if previous sync is abort, sending the mappings back to complete it.
    maybeSendUpdateMap (type) ;
    if (0 == (AppDBRefnum = DmOpenDatabaseByTypeCreator (
            DBTypeData, dbCreator, dmModeReadWrite | dmModeShowSecret)))
    {
        return false ;
    }
    if (!getDBLastModDateTime ())
    {
        DmCloseDatabase (AppDBRefnum) ;
        return false ;
    }
    for (; ;)
    {
            // sending
        updateStatus (STATUS_SENDING) ;
        if (!sendAllRecords (type)) {
            DmCloseDatabase (AppDBRefnum) ;
            return false ;
        {
        // receiving
        updateStatus (STATUS_RECEIVING) ;
        // this is the main loop waiting till all action object
        // transaction are done
        if (!receiveAllRecords (type))
        {
            DmcloseDatabase (AppDBRefnum) ;
            return false ;
        }
    }
    DmCloseDatabase (AppDBRefnum) ;
        return true ;
}
// this routine sends all fresh changes to
// the Synchronizer core for the GUD
static Boolean sendAllRecords (Byte type)
{
    Word     recordNum = 0 ;
    Word         total ;
    Ushort       attr;
    ULong        uID ;
    ULongPtr     ulp ;
    Handle       ExistingRecordH ;
    UInt         ExistingRecordCount ;
    Word     i, offset ;
    Boolean      flagSomethingSent = false ;
    total = DmNumRecordsInCategory (AppDBRefnum, dmAllCategories) ;
    ExistingRecordCount = 0 ;
    // ... boring housekeeping stuff goes here ...
    for (; ;)
    {
        // walk through all the records on the device and then
        // decide which ones to send to the server
        for (CurrentRecordNum=0, offset=i=0; i<total; i++, offset=1)
        {
            if (DmSeekRecordInCategory (AppDBRefnum, &CurrentRecordNum,
```

-continued

```
                offset, dmSeekForward, currentCategory) == 0)
        {
            if (DmRecordInfo (AppDBRefnum,
                    CurrentRecordNum, &attr, &uID, NULL) == 0)
            {
                // send existing pilot record (that is one that is not deleted)
                if (!(attr & dmRecAttrDelete))
                {
                    ulp[ExistingRecordCount] = uID ;
                    ExistingRecordCount ++ ;
                    // if the record has been modified since the last synch,
                    // send it to the server
                if (attr & dmRecAttrDirty())
                {
                    // now send up the record to the server and ask for an
                    // acknowledgement that the record has been received.
                    // (sendActionUpdate will return true if the record has
                    // been acknowledged by the server and so we don't have
                    // to send this modification again since the server
                    // guarantees it won't be lost.)
                    if (!sendActionUpdateAddr (uID) ||
                    {
                        // an error happened, so give up. the typical
                        // error is that the connection to the server was lost
                        MemHandleUnlock (ExistingRecordH) ;
                        MemHandleFree (ExistingRecordH) ;
                        return false ;
                    }
                    flagSomethingSent = true ;
                    // mark the record as sent to indicate it doesn't need to
                    // be sent again
                    dmRecAttrClearDirty();
                    updateStatus (STATUS_SENDING) ;
                }
            }
        }
        else
            break ;
        }
    }
}
// tell server that we have sent all of the records
if (flagSomethingSent
{
    if (!sendActionLastRecordSent ()) // if no error
    {
        MemHandleFree (ExistingRecordH) ;
        return false ;
    }
    updateStatus (STATUS_RECEIVING) ;
    do {
        if (!receiveActionObject (DB_TYPE_NULL))
        {
            MemHandleFree (ExistingRecordH) ;
            return false ;
        }
    } while (ao_action_type != ACTION_ACK_LAST_RECORD_SENT) ;
}
updateStatus (STATUS_SENDING) ;
// tell server the list of existing records so that it
// can calculate what has been deleted
if (!sendActionExistingRecordList (ExistingRecordH,
            ExistingRecordCount))
{
    MemHandleFree (ExistingRecordH) ;
    return false ;
}
    return true;
}
```

While the invention is described in some detail with specific reference to a single preferred embodiment and certain alternatives, there is no intent to limit the invention to that particular embodiment or those specific alternatives.

What is claimed is:

1. A method of synchronizing a first dataset with a second dataset, each of said first and second datasets comprising a plurality of corresponding records, wherein changes have been made to the records in the first dataset that have not yet been synchronized with the second dataset, the method comprising:

identifying a plurality of changes to the records in the first dataset to be synchronized with individual records of the second dataset in a synchronization session, wherein said plurality of changes have not yet been synchronized with the second dataset;

initiating a synchronization session to synchronize said plurality of changes from the first dataset to the second dataset;

sending a subset of one or more of said plurality of changes, but not all of said plurality of changes, from said first dataset to said second dataset;

receiving said subset of changes at said second dataset;

sending acknowledgment of receipt of said subset of changes from said second dataset to said first dataset;

receiving said acknowledgment of receipt of said subset of changes at said first dataset;

propagating said subset of changes into said second dataset; and if there is no failure of said synchronization session, completing said synchronization by sending the remainder of said plurality of changes from said first dataset to said second dataset and propagating the remainder of said plurality of changes into said second dataset; or, if there is a failure of said synchronization session before the remainder of the plurality of changes are received by said second dataset and propagated into said second dataset, making said subset of changes available to a user of said second dataset and making said subset of changes available for subsequent synchronizations between said second dataset and one or more other datasets before the remainder of the plurality of changes are received by said second dataset.

2. The method of claim 1, wherein if there is a failure of said synchronization session before the remainder of the plurality of changes are received by said second dataset and propagated into said second dataset, the method further comprises the steps of:

initiating a second synchronization session between said first and second datasets;

sending the remainder of said plurality of changes from said first dataset to said second dataset, but not sending any of said subset of changes;

receiving the remainder of said plurality of changes at said second dataset; and propagating the remainder of said plurality of changes into said second dataset.

3. The method of claim 2, wherein, after the remainder of said plurality of changes has been sent from said first dataset and received at said second dataset, said second dataset sends changes to said first dataset, which are received at said first dataset and propagated into said first dataset.

4. The method of claim 3, wherein, after the changes from the second dataset are propagated into the first dataset, the first dataset sends new IDs to the second dataset for all new records received from the second dataset.

5. The method of claim 1, wherein said first dataset is a client dataset and said second dataset is a reference dataset of a synchronization engine.

6. The method of claim 5, wherein said first dataset is in a portable device and said second dataset resides on a server computer.

7. The method of claim 5, wherein said first dataset is in a portable device and said second dataset resides on a desktop computer.

8. The method of claim 1, wherein the first dataset and the second dataset contain PIM data.

9. The method of claim 8, wherein the plurality of changes include additions, updates and deletions of data records.

10. The method of claim 1, wherein said acknowledgment of receipt of said subset of changes includes an unambiguous identifier for each received change.

11. A method of synchronizing records of a client dataset with records of a reference dataset of a synchronization engine, the method comprising the steps of:

A) identifying a first plurality of changes to the records in the client dataset to be synchronized with the records of the reference dataset;

B) initiating a synchronization session between the client dataset and the reference dataset; and C) communicating said first plurality of changes to the reference dataset and synchronizing said first plurality of changes into the records of the reference dataset, said step of communicating and synchronizing the first plurality of changes further comprising the steps of:

a) sending a subset of the first plurality of changes from the client dataset to the synchronization engine;

b) receiving the subset of the first plurality of changes at the synchronization engine;

c) synchronizing the subset of the first plurality of changes into the reference dataset and making the subset of the first plurality of changes available in said reference dataset for user access and for synchronization with another dataset before all of said first plurality of changes are received by said synchronization engine;

d) sending acknowledgements of the receipt of the subset of the first plurality of changes from the synchronization engine;

e) receiving the acknowledgements of the receipt of the subset of the first plurality of changes at the client dataset;

f) repeating steps a) to e) until all of the first plurality of changes are received at the synchronization engine, synchronized into the reference dataset and acknowledged back to the client dataset; and g) if said synchronization session fails before all of said first plurality of changes are received by said synchronization engine, synchronized into the reference dataset and acknowledged back to the client dataset, initiating a subsequent synchronization session and continuing the step C), without resending from the client dataset any changes for which acknowledgements have already been received at the client dataset.

12. The method of claim 11, further comprising the steps of:

D) identifying a second plurality of changes in the reference dataset to be synchronized with the client dataset; and E) communicating said second plurality of changes to the client dataset and synchronizing said second plurality of changes into the client dataset, said step of communicating and synchronizing the second plurality of changes further comprising the steps of:

a) sending a subset of the second plurality of changes from the synchronization engine to the client dataset;

b) receiving the subset of the second plurality of changes at the client dataset;

c) synchronizing the subset of the second plurality of changes into the client dataset;

d) sending acknowledgements of the receipt of the subset of the second plurality of changes from the client dataset;

e) receiving the acknowledgements of the receipt of the subset of the second plurality of changes at the synchronization engine;

f) repeating steps a) to e) until all of the second plurality of changes are received at the client dataset, synchronized into the client dataset and acknowledged back to the synchronization engine; and g) if said synchronization session fails before all of said second plurality of changes are received by said client dataset, synchronized into the client dataset and acknowledged back to the synchronization engine, initiating a subsequent synchronization session and continuing the step E), without resending from the synchronization engine any changes for which acknowledgements have already been received at the synchronization engine.

13. The method of claim 12, wherein the substep c) of the step E) further comprises making the subset of the second plurality of changes available in said client dataset for user access and for synchronization with another dataset before all of said second plurality of changes are received by said client dataset.

14. The method of claim 12, wherein for substep d) of the step E), the acknowledgement from the client dataset to the synchronization engine includes a record ID for a new record in the client dataset when the change from the synchronization engine comprises an addition of a new record.

15. The method of claim 12, wherein for substep d) of the step C), the acknowledgments from the synchronization engine to the client dataset include an unambiguous identifier for each received change.

16. The method of claim 12, wherein for substep d) of the step E), the acknowledgments from the client dataset to the synchronization engine include an unambiguous identifier for each received change.

17. A method of synchronizing a first dataset with a second dataset, each of said first and second datasets comprising a plurality of corresponding records, wherein changes have been made to the records in the first dataset that have not yet been synchronized with the second dataset, the method comprising:

identifying a plurality of changes to the records in the first dataset to be synchronized with the records in the second dataset in a synchronization session, wherein said plurality of changes have not yet been synchronized with the second dataset;

initiating a synchronization session to synchronize said plurality of changes from the first dataset to the second dataset;

sending a subset of one or more of said plurality of changes, but not all of said plurality of changes, from said first dataset to said second dataset;

receiving said subset of changes at said second dataset;

updating a last synchronization time for each of the records affected by the subset of the plurality of changes;

propagating the subset of changes into said second dataset; and if there is no failure of said synchronization session, completing said synchronization by sending the remainder of said plurality of changes from said first dataset to said second dataset, propagating the remainder of said plurality of changes into said second dataset and updating an overall last synchronization time; or, if there is a failure of said synchronization session before the remainder of the plurality of changes are received by said second dataset and propagated into said second dataset, not updating the overall last synchronization time, wherein the last synchronization times are used to determine changes that should be synchronized in subsequent synchronization sessions.

18. The method of claim 17, further comprising the steps of:

sending acknowledgment of receipt of said subset of changes from said second dataset to said first dataset; and receiving said acknowledgment of receipt of said subset of changes at said first dataset.

19. The method of claim 17, wherein the last synchronization times are stored in a reference dataset of a synchronization engine.

* * * * *